Figure 1:
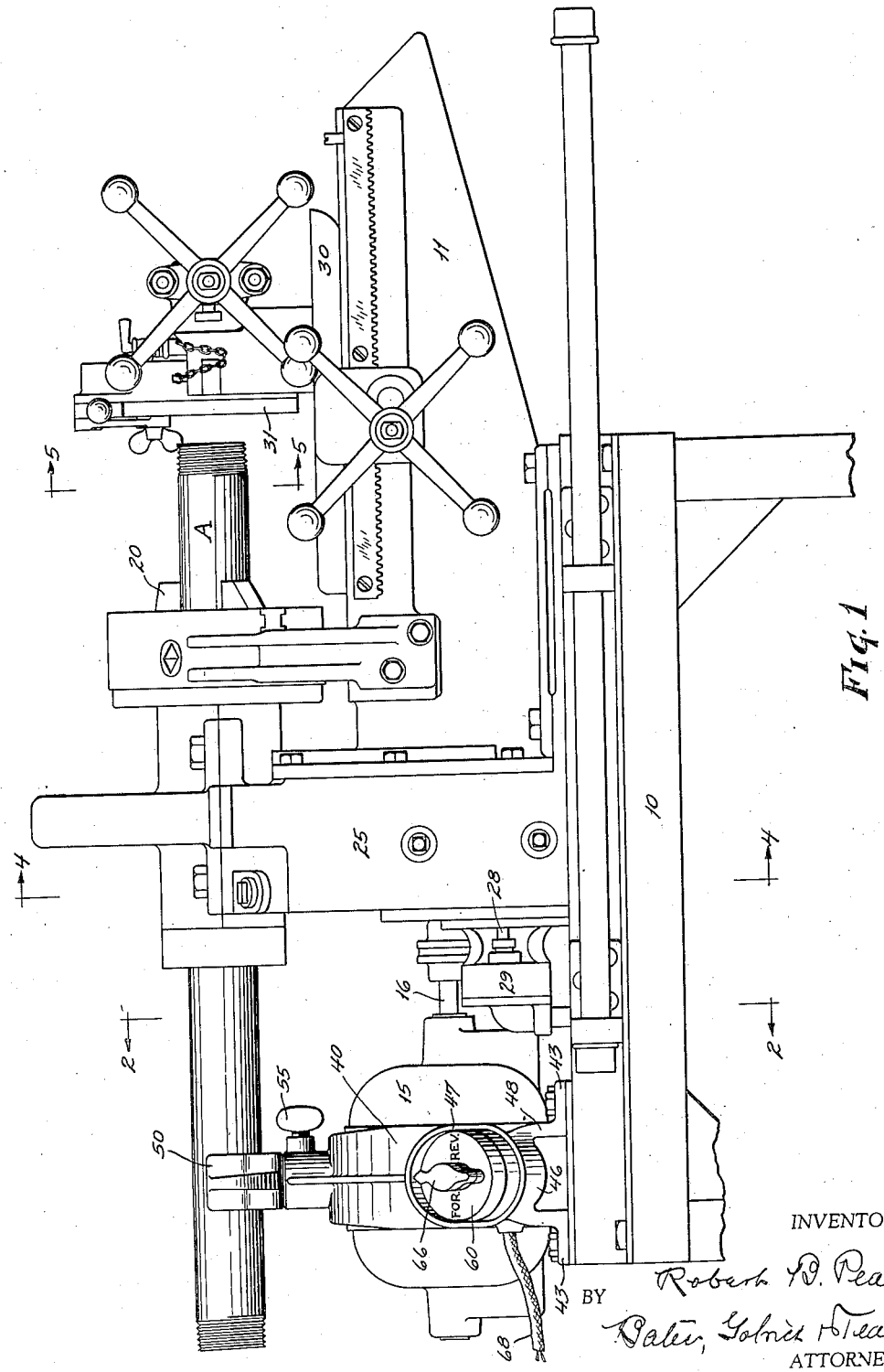

Sept. 29, 1936.    R. B. PEALER    2,055,908
PIPE SUPPORT
Filed Dec. 27, 1935    2 Sheets-Sheet 1

INVENTOR.
Robert B. Pealer
BY
ATTORNEYS

Sept. 29, 1936. R. B. PEALER 2,055,908
PIPE SUPPORT
Filed Dec. 27, 1935 2 Sheets-Sheet 2

INVENTOR.
Robert B. Pealer,
BY
Bates, Golrick Fear
ATTORNEYS.

Patented Sept. 29, 1936

2,055,908

UNITED STATES PATENT OFFICE 2,055,908

PIPE SUPPORT

Robert B. Pealer, Warren, Ohio, assignor to Beaver Pipe Tools, Inc., Warren, Ohio, a corporation of Ohio Application December 27, 1935, Serial No. 56,342

9 Claims. (Cl. 10—89)

This invention relates to an adjustable rest for supporting the extended portion of a pipe mounted in a chuck in a suitable pipe working machine. My pipe rest is especially well adapted for use in such a pipe working machine as set out in my Patent Number 1,947,874, issued February 20th, 1934, to my assignee, The Borden Company, now known as Beaver Pipe Tools, Inc. That machine comprises a suitable bed having an upright standard, a rotary chuck on a horizontal axis at the top of the standard, a motor carried by the bed directly below the pipe axis, and reduction gearing connecting the armature shaft of the motor with the chuck. My invention provides a U-shaped standard adapted to be mounted on the bed and extend over the motor of such machine and carry adjustably a recessed block on which the pipe may rest.

The recessed block which the pipe engages normally rests on the crown of the U-standard, where the block is in proper position for the largest pipe, but may be readily and accurately set for any size of pipe occupying the chuck. The inverted U-shaped standard acts also to protect the motor from injury by a pipe which may be inadvertently dropped, and is further provided with a housing to receive and protect the motor controlling switch.

My invention is hereinafter more fully explained in connection with the description of a preferred embodiment thereof which is illustrated in the drawings. The essential novel features are summarized in the claims.

Figure 5:
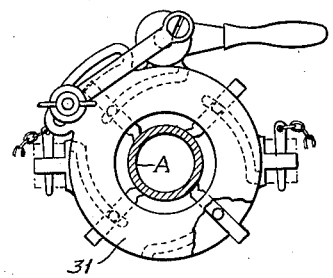
Figure 2:
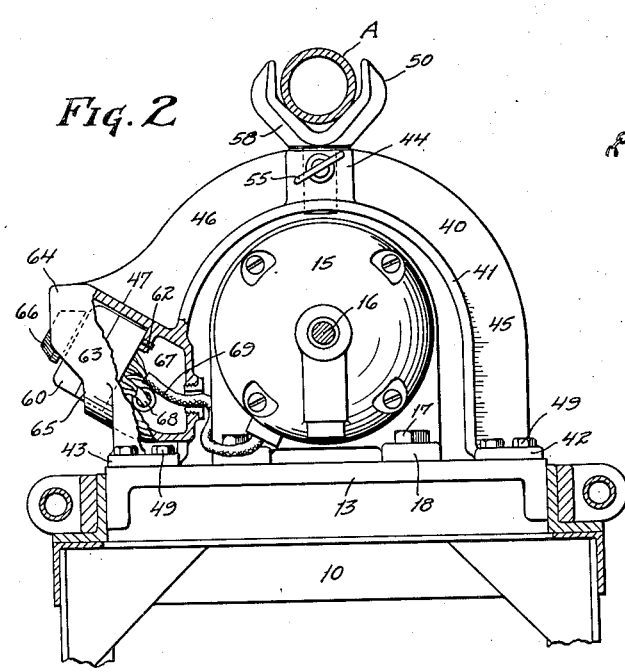
Figure 3:
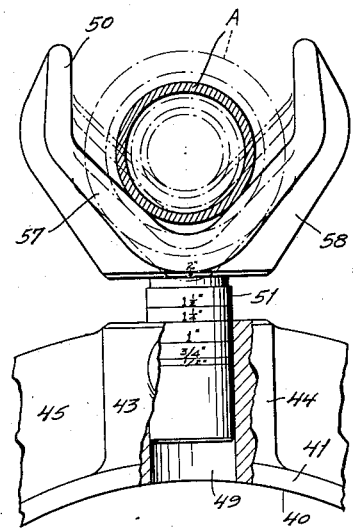
Figure 4:
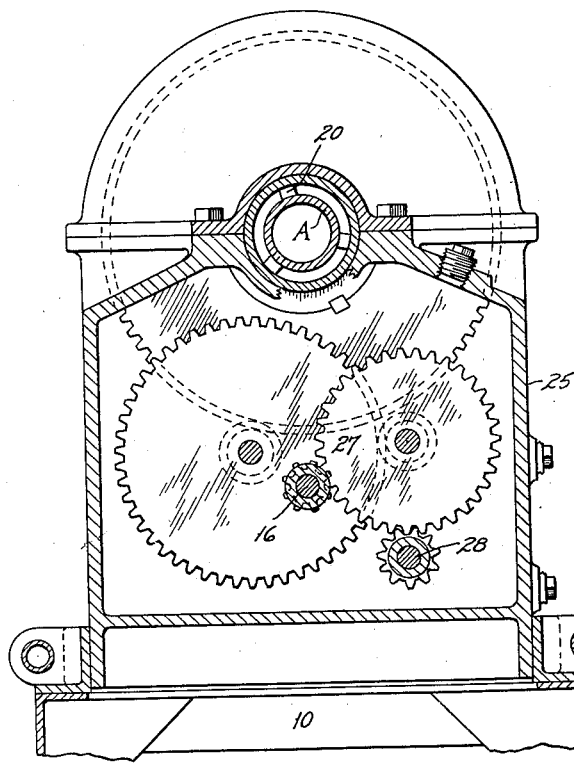

In the drawings, Fig. 1 is a side elevation of a pipe working machine carrying my pipe support; Fig. 2 is a vertical section, indicated by the line 2—2 on Fig. 1, looking in the direction toward the motor with the switch housing partly broken away; Fig. 3 is a sectional elevation of the pipe rest and the upper portion of the supporting standard in the same plane as Fig. 2; Fig. 4 is a sectional elevation showing reduction gearing employed within the frame housing between the armature shaft and the chuck which carries the pipe resting on the pipe rest, the section being indicated by the line 4—4 on Fig. 1; Fig. 5 is an elevation of a threading unit which may be employed on the machine to operate on the pipe while clamped in the chuck and resting on the pipe rest, this view being a sectional elevation on the line 5—5 of Fig. 1.

Briefly, the pipe working machine shown in Fig. 1 comprises a frame 10, carrying an overhanging bed 11, a motor 15 supported on the frame 10, a rotating chuck 20 mounted in a hollow standard 25 which houses reduction gearing 27 connected with the armature shaft 16 of the motor, and a carriage 30 slidably mounted on the extension bed and carrying suitable pipe working tools, as illustrated by the chaser carrying ring 31 of Fig. 5. Incidentally, the reduction gearing 27 may, through a gear 28, Fig. 4, operate an oil pump 29, Fig. 1. The chuck 20 is of any suitable form adapted to clamp a pipe illustrated at A in each of the figures and extending directly over the motor.

Coming now to the present invention, Figs. 1 and 2 show at 40 a standard of inverted U shape which has an inner wall 41, horizontally extending base flanges 42 and 43, an upwardly extending tubular boss 44 at the crown of the standard, and vertical webs 45 and 46 connected with the inner wall and the tubular boss. The standard also has a hollow portion 47 to house the switch, as hereinafter described. The stiffening web 45 connects at its lower end with the feet 42 on each side of the web, while the web 46 at its lower end merges with the top region of the housing 47. The lower portion of such housing is connected by downward webs 48 with the forward feet 43.

The standard described extends directly over the motor in a position otherwise unoccupied in the machine, as shown clearly in Fig. 2, and thus forms a protection for the motor. The feet 42 and 43 of the standard rest on and are bolted by cap screws 49 to that portion 13 of the bed 10 which carries the motor, the latter being shown as secured by a cap screw 17 passing through the motor feet 18. By spacing the feet 43 on the forward part of the standard, I obtain a very effective support for the standard, rigidly bracing it against any possible displacement in the direction lengthwise of the machine.

The pipe rest proper comprises a V-shaped head 50, having a downwardly extending cylindrical shank 51 adapted to occupy the bore 49 of the tubular boss 44 and be held in any desired position therein by a set screw 55. More specifically, the rest 50 is a block with an inner wall 57 which is V-shaped in the lower portion, then rises vertically as shown in Fig. 3 and is braced by an external web 58. The entire block and cylindrical shank is one integral piece. The shank 51 of the rest may be graduated with suitable markings to indicate different sizes of pipe, as indicated by the numerals and fractions shown in Fig. 3.

The head 50 is so proportioned that when it rests directly on top of the boss 44, as shown in Fig. 2, it is in proper position for carrying the maximum size of pipe which the chuck may clamp. For instance, if the maximum size of chuck is for two-inch pipe, then the pipe A in Fig. 2 is a two-inch pipe. In Fig. 3 I have shown the head set for carrying a 1¼ inch pipe A which is shown in full lines in that figure, other sizes of pipe being indicated by broken lines, corresponding to various other designations on the shank 51.

It results from the construction described that the pipe-rest may be very accurately positioned with reference to the pipe in the chuck, and support the same in accurate axial alignment with the chuck and pipe working tool. This is a great advantage over the use of an independent rest standing on the floor where a slight inaccuracy is almost inevitable and frequently results in mis-alignment of a pipe of considerable length and producing inaccuracy in the threading or other operation on the pipe.

Furthermore, the mere loosening of the set screw 55 causes the pipe rest to assume automatically the position suitable for the largest pipe of the chuck, which it is most important to properly support. The pipe rest is a sufficient distance away from the chuck jaws so that a long pipe may be accurately supported. A pipe in the chuck too short to reach the rest does not need any outer support. For smaller sizes the rest is elevated to the desired position, as indicated by the markings on the rest shank and is there clamped.

As shown in Figs. 1 and 2, I form on the front portion of the U-shaped standard 40, an upwardly inclined tubular extension 47 which is adapted to house the electric switch 60. This extension may have an inwardly extending flange 62 on which such switch may rest. The wall 63 of this housing is substantially cylindrical, but is continued forwardly at the top portion 64 and cut away at the bottom portion 65, as shown in Fig. 2 to provide a thorough protection for the switch while allowing ready access to the switch knob 66. Beyond the base of the switch is a cavity 67 within the housing with openings in its walls through which pass the electric cable 68 coming to the switch and the cable 69 passing from the switch to the motor, as shown in Fig. 2. This enables the conductors to be connected to the switch while it is out of the housing, the switch thereafter being readily placed in the housing.

It will be understood from the description of the switch housing that it not only provides very ready means for carrying the switch, but amply protects the switch from accidental blows. Accordingly, if one inadvertently drops a pipe above the motor, there is no danger of it either hitting the motor or the switch. The web 45 simply guides it free from either of them. The entire U-shaped standard with its rest-supporting boss and switch housing may be one single integral casting.

I claim:

1. The combination of a pipe working tool having a motor, a chuck, and transmission mechanism between the motor shaft and chuck, of a U-shaped standard extending over the motor, and a rest for the extension of the pipe in the chuck, said rest being adjustably mounted on the U-shaped standard.

2. The combination of a bed, a motor thereon, a rotary pipe chuck geared with the motor, a U-shaped standard extending over the motor and secured to the bed in front of and behind the motor, said standard having a tubular boss directly above the motor, and a pipe rest adjustably mounted in the boss.

3. The combination of a bed, a rotary chuck carried thereby, a motor carried by the bed having its axis parallel with the chuck axis and below it, reduction gearing connecting the armature shaft of the motor with the chuck, a standard of inverted U-shape extending over the motor and secured to the bed, said standard having at its crest a tubular boss, a pipe rest having a V-shaped recess to engage the extended portion of a pipe in the chuck and having a shank adjustably mounted in the boss and a pipe-working tool supported by the bed on the other side of the chuck and adapted to engage a pipe supported by the chuck and pipe rest.

4. The combination of a U-shaped standard adapted to extend over a motor, a hollow boss at the crest of the standard, a pipe rest having a shank mounted in the boss, means for clamping the shank in various elevations in the boss, the standard having an upwardly inclined tubular housing near its lower end on one side adapted to receive an electric switch connected to the motor.

5. The combination of a U-shaped standard adapted to extend over a motor, a hollow boss at the crest of the standard, a pipe rest having a shank adapted to occupy various positions in the boss, the standard having a forwardly projecting tubular housing near its lower end on one side, a web forming a part of the standard connecting the upper portion of the housing with the tubular boss, and webs connected to the lower portion of the housing and terminating in laterally extending front feet.

6. The combination of a bed, a rotary chuck carried thereby, a motor carried by the bed having its axis parallel with the chuck axis, reduction gearing connecting the armature shaft of the motor with the chuck, a standard of inverted U-shape extending over the motor and having base flanges secured to the bed, said standard having at its crest a tubular boss, a pipe rest having a V-shaped recess to engage the extended portion of a pipe in the chuck and having a shank adjustably mounted in the boss, said standard having on its forward side near the lower end a tubular housing open to the front, and a switch occupying the housing and protected thereby, there being electric connections between the switch and the motor.

7. A device of the character described comprising a standard of inverted U-shape with the height of the opening substantially as great as the width thereof to enable the standard to embrace freely a circular motor standing on the same horizontal surface, said standard having base flanges and a tubular boss at its crest, a rest comprising a V-shaped block with a shank extending into the tubular boss of the standard, and means for clamping the shank in various elevations in the standard.

8. A device of the character described comprising a standard of inverted U-shape having an inner U-shaped wall, a hollow boss at the crest of such wall, laterally projecting feet at the base of the standard, a rest comprising a V-shaped block with a shank adapted to occupy the hollow boss, said rest having a shoulder adapted to engage the top of the boss to define the lowermost position of the rest, the bottom of the shank when the rest is in such lowermost position being approximately flush with the undersurface of the standard at the top, and means carried by the boss for clamping the shank in various elevations in the standard.

9. The combination with a base, a motor thereon, a U-shaped standard extending over the motor and secured to the base, a rest carried by the standard at its crest, said standard having a hollow housing on one of its upright legs, and an electric switch mounted in the housing and electrically connected with the motor.

ROBERT B. PEALER.